US009965434B2

(12) United States Patent
Verplanken et al.

(10) Patent No.: US 9,965,434 B2
(45) Date of Patent: May 8, 2018

(54) DATA PACKET PROCESSING

(71) Applicant: INTERNATIONAL BUSINESS MACHINES CORPORATION, Armonk, NY (US)

(72) Inventors: Fabrice Jean Verplanken, La Gaude (FR); Francois Abel, Rueschlikon (CH); Claude Basso, Nice (FR); Damon Philipe, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 14/862,599

(22) Filed: Sep. 23, 2015

(65) Prior Publication Data
US 2016/0085722 A1    Mar. 24, 2016

(30) Foreign Application Priority Data

Sep. 24, 2014    (GB) .................................. 1416837.1

(51) Int. Cl.
*G06F 13/00* (2006.01)
*G06F 13/14* (2006.01)
*G06F 13/42* (2006.01)
*G06F 13/40* (2006.01)

(52) U.S. Cl.
CPC ...... *G06F 13/4282* (2013.01); *G06F 13/4022* (2013.01)

(58) Field of Classification Search
None
See application file for complete search history.

(56) References Cited

U.S. PATENT DOCUMENTS

| 8,219,713 | B2 | 7/2012 | Shah et al. | |
|---|---|---|---|---|
| 2004/0117764 | A1 | 6/2004 | Sinha et al. | |
| 2011/0219208 | A1* | 9/2011 | Asaad ..................... | G06F 15/76 712/12 |
| 2011/0271059 | A1 | 11/2011 | Aho et al. | |
| 2012/0151307 | A1 | 6/2012 | Abel et al. | |
| 2012/0155267 | A1 | 6/2012 | Abel et al. | |
| 2012/0159132 | A1* | 6/2012 | Abel ..................... | G06F 9/3885 712/229 |
| 2012/0198213 | A1* | 8/2012 | Abel ..................... | G06F 9/3016 712/225 |
| 2013/0326039 | A1* | 12/2013 | Shah ..................... | H04L 41/04 709/223 |

(Continued)

OTHER PUBLICATIONS

International Search Report, dated Mar. 31, 2015 from corresponding International Application No. GB1416837.1, 4 pages.

(Continued)

*Primary Examiner* — Michael Sun
(74) *Attorney, Agent, or Firm* — Cantor Colburn LLP

(57) ABSTRACT

Proposed is an action machine for processing packet data in a network processor. The action machine comprises: first and second data storage units adapted to store data for processing; and a processing unit adapted to process data from the first and second data storage units. The first storage unit is adapted to be accessed by the processing unit and a unit external to the action machine, and the second storage unit is adapted to only be accessed by the processing unit.

12 Claims, 6 Drawing Sheets

(56) References Cited

U.S. PATENT DOCUMENTS

2013/0343389 A1   12/2013  Stroud et al.
2013/0346987 A1*  12/2013  Raney ................... G06F 9/5044
                                                718/102
2016/0134471 A1*  5/2016   Basso ................. H04L 41/0806
                                                709/226

OTHER PUBLICATIONS

Great Britain Search Report, dated Mar. 31, 2015 from corresponding Great Britain Application No. GB1416837.1.
Great Britain Search Report dated Mar. 31, 2015 from corresponding GB Application No. GB1416837.1, 4 pages.

* cited by examiner

DATA PACKET PROCESSING

RELATED APPLICATION

This application claims priority under 35 U.S.C. 119(a) of Great Britain Application No. 1416837.1, filed Sep. 24, 2014, the entire content of which is incorporated herein by reference.

BACKGROUND OF THE DISCLOSURE

1. Field of the Disclosure

The invention relates to the field of packet processing for data networking. More particularly, the invention relates to data packet processing in a network processor.

2. Description of the Related Art

Due to the increasing use of data intensive applications such as video streaming or Voice-over-IP via the internet, communication links (e.g. optic or copper cables) and data processing units which are operable to transmit and process a large number of data packets in a short amount of time are needed. Data packet processing supporting such data intensive applications requires significant computational power and the demand for processing power for managing Internet traffic is continuously growing. New types of specialized processors, so called 'network processors', have been developed which are particularly suited for the handling and processing of data packets to be transmitted via a network, in particular the Internet.

Conventionally, network processors were either constructed as general-purpose processors (GPPs) or as application-specific integrated circuits (ASICs). While GPPs provide for high flexibility, they may not be specifically designed for the needs related to network processing and are therefore often too slow. To the contrary, ASICs are integrated circuits (ICs) designed for the particular needs of processing data packets to be transmitted over a network. ASICs can therefore solve their particular tasks very quickly and efficiently, but they are expensive and inflexible.

In network management environments, the interface between a management controller (MC) and a network controller (NC) of a network processor is very important. The Network Controller-Sideband Interface (NC-SI) specification has been created to define a standardized interface that enables a NC to provide network access for a MC, while allowing the NC to simultaneously and transparently provide network access for a host system. By way of example, the NC-SI specification defines protocols and electrical specifications for a common Sideband Interface (SI) between a MC and a 802.3 Local Area Network (LAN) via one or more external NCs. A preliminary version of such a NC-SI specification was published in June 2007 by a sub-team of the Pre-OS Working Group.

A network processor usually processes data packets by undertaking a parsing step. In doing so, a parser of the network processor extracts, manipulates and analyzes the contents of packet headers and fields and passes parsed packets or parts thereof to other network processor components. Parsing performance is typically increased by increasing the clock frequency of the logic storing and/or executing a parsing instruction. Said approach requires a more powerful and expensive hardware and leads to an increased power dissipation, an unwelcome effect in financial and ecologic terms.

SUMMARY OF THE DISCLOSURE

According to an aspect of the invention, there is provided an action machine for processing packet data in a network processor, the action machine comprises: first and second data storage units adapted to store data for processing; and a processing unit adapted to process data from the first and second data storage units, wherein the first storage unit is adapted to be accessed by the processing unit and a unit external to the action machine, and wherein the second storage unit is adapted to only be accessed by the processing unit.

Proposed is a concept of an action machine that may be employed in a network processor, wherein the action machine is arranged for the purpose of processing or manipulating packet data. An action machine according to the embodiment may therefore be employed in conjunction with a parser to undertake data processing and/or data manipulation for the parser, thereby relieving the parser of data processing/manipulation processes and consequently improving parsing performance.

Embodiments may employ the idea of reducing an amount of data/information the action machine shares with an external unit such as a packet parser. A first, externally accessible data storage unit can be employed for loading data from/to a packet parser, for example, while a second, private (e.g. restricted access) data storage unit can be employed for use only by a processing unit of the action machine. By arranging the second, private data storage unit to have a larger data storage capacity than the first externally accessible data storage unit, a larger data storage unit (or repository) may be made available to the processing unit without complicating and/or increasing the size of the externally accessible interface (such as an Action Machine Filler (AMF), for example). Reducing the size of the first, externally accessible data storage unit, and thus flexibility in addressing, may also allow a reduction or simplification in rule format/complexity.

Thus, an embodiment may provide an action machine for network processor, wherein the action machine has a processing unit which can operate on (e.g. manipulate) data loaded from a first, public data repository and a second, private data repository using direct and indirect addressing.

The processing unit may be adapted to manipulate data from the first and/or second data storage units and to provide a result of said manipulation to the first and/or second data storage units and/or a unit external to the action machine. In this way, the processing unit may undertake data manipulation and the results of such manipulation may then be shared with (or made accessible to) a unit external to the action machine, such as a packet parser of a network processor for example. A packet parser may therefore use an embodiment to perform data manipulation for use in packet parsing processes and/or the assembly of response packets.

An action machine according to an embodiment may be adapted to receive and store data from a packet parser in the first data storage unit. Embodiments may therefore be implemented in conjunction with a packet parser within a network processor. Such embodiments may thus provide an independent execution assigned to particular data processing or manipulation functions. Embodiments may be adapted to be automatically trigger upon receipt of data sufficient to perform a particular data processing/manipulation function.

In embodiments, the processing unit may comprise an arithmetic logic unit. The processing unit may therefore perform data manipulation tasks such as additions, comparisons, realignments, bit-maskings, concatenations, etc. The processing unit may instructed by instruction/operation codes issued from parser and/or a network processor.

In an embodiment, at least one of the first and second data storage units may comprise an array of registers. Such register arrays may be may be individually addressable so as to enable data to be written to the registers of the first and second data storage units based on data provided to the action machine. The first and second data storage units may therefore be initialized or prepared with predetermined data, and the data stored may then be modified or edited on an individual register-by-register basis (by the processing unit for example).

An embodiment may further comprise further comprise a plurality of data buses connecting the processing unit and the second data storage unit. The plurality of data buses may be adapted to permit simultaneous transfer of data to/from different storage locations of the second data storage unit. Thus, where a result of processing comprises multiple parts (for example, a main part of a result such as an 8-bit addition, and a complementary part of the result such as carry out of the 8-bit addition), the two results may be written simultaneously to different locations of the second data storage unit.

The first data storage unit may comprise a plurality of byte-wide registers adapted to store values for, or from, fields of a packet adhering to a standardized communication protocol. In this way, each byte-wide register may correspond to, and thus store data for, a field of a data packet, wherein the properties or characteristics of the fields forming a response packet are defined in accordance with a standard communication protocol or standard. By way of example, the standardized communication protocol may adhere to a Network Controller-Sideband Interface, NC-SI, specification. In such an embodiment, a byte-wide register of the first data storage unit may store data for a particular field of a response a packet that adheres to the NC-SI specification.

An action machine according to an embodiment may be able to manipulate bytes extracted from NC-SI commands sent by a MC (and/or from NC logic) in order to use them in a command parsing process and/or the assembly of response packets. Byte manipulation may include additions, comparisons, realignments, bit maskings, concatenations, etc. Embodiments may be employed in a network processor. Thus, according to an aspect of the invention, there may be provided a network processor comprising an action machine according to an embodiment.

Embodiments may thus provide a network processor for processing data packets. Such embodiments may provide for improved performance of processing data packets, in particular in the context of multi-gigabit networks for example.

According to another aspect of the invention, there is provided a method of operating an action machine for processing packet data in a network processor, the action machine comprising: first and second data storage units adapted to store data for processing; and a processing unit adapted to process data from the first and second data storage units, wherein the first storage unit is adapted to be accessed by the processing unit and a unit external to the action machine, and wherein the second storage unit is adapted to only be accessed by the processing unit, the method comprising: causing the processing unit to manipulate data from the first and/or second data storage units and to provide a result of said manipulation to at least one of: the first data storage unit, the second data storage unit; and a unit external to the action machine.

According to yet another aspect of the invention, there is provided a method of operating a network processor comprising a packet parser and an action machine according to an embodiment, the method comprising: causing the packet parser to parse a data packet and to supply data relating to a result of parsing the data packet to the action machine; causing the action machine receive the data supplied from the packet parser; and, based on the received data, operating the action machine according to an embodiment.

According to yet another aspect of the invention, there is provided a computer program product for processing data packets in a network processor, wherein the computer program product comprises a computer-readable storage medium having computer-readable program code embodied therewith, the computer-readable program code configured to perform all of the steps of a method according to an embodiment.

In an embodiment, a computer system may be provided which comprises: a computer program product according to an embodiment; and one or more processors adapted to perform a method according to an embodiment by execution of the computer-readable program code of said computer program product.

Embodiments of the invention provide for a network processor and method for operating said network processor which may increase the speed of data packet parsing without necessitating the use of more expensive hardware with an increased clock cycle frequency.

Embodiments may be flexibly adaptable to a multitude of different data packet protocols and formats and to a multitude of different network processor hardware architectures.

Embodiments may be highly flexible and fast at the same time by complementing hardware-level performance by a parser being operable to execute flexibly adaptable computer interpretable instructions in the form of software, i.e. in the form of instructions written in a programming language.

A 'network processor' as referred to herein is an integrated circuit which has a feature set specifically targeted at the networking application domain. Network processors usually consist of multiple, connected processing and memory units. Network processors are components of many different types of network equipment such as routers, switches, firewalls, session border controllers and the like.

A 'rule' as referred to herein is a set of computer interpretable instructions specifying how one or more data packets are to be processed. A rule according to embodiments may be a computer-interpretable statement with at least two logical parts: an if-clause and a then-clause, whereby the then-clause is only executed in case the if-clause returns the Boolean value 'true'.

A 'rules repository' as referred to herein is any volatile or non-volatile computer-readable data storage medium having stored a plurality of rules.

The term 'action machines' as referred to herein refers to hardware accelerators which are part of the network processor. Action machines process selected parts of data packets and support functions such as packet parsing and classification, high-speed pattern search, checksum calculation and others.

The term 'picoprocessor' as referred to herein refers to a scaled down RISC processor. A picoprocessor according to some embodiments comprises sixteen 32-bit or thirty-two 16-bit general purpose registers per thread and a one-cycle arithmetic-logical unit (ALU) supporting an instruction set that includes e.g. binary addition and subtraction, bit-wise logical AND, OR and NOT operations, compare operation, a counting function, a logical or arithmetic shift left and right, bit-manipulation commands and others.

The expression 'loaded data' as used herein refers to any data, including computer-interpretable instructions, which is available for a processor without any additional clock cycle for loading said data. 'Loaded data' can be stored e.g. in one or more registers of said processor or can be part of the inbuilt instruction set of said processor.

A parser, according to embodiments, comprises a set of one or more programmable picoprocessors which are operable to execute one or more rules having been loaded from the rules repository. Said rules comprise computer-interpretable instructions for parsing data packets. Parsing as used herein is the process of determining the structure of a data packet and processing its content. A parser may be 'programmable', as the rules can be easily adapted to any change in the processed data packet type or according to new requirements regarding the processing workflow. A parser comprising the picoprocessors executing the rules can be described as finite state machine. According to some embodiments, the picoprocessors of a parser may further comprise a set of instructions which are integral part of the picoprocessors and are immediately available for execution by the picoprocessors without any additional loading step.

According to embodiments, a data packet may comprise an envelope (or header) section and a payload section. Rules may be loaded and used by a parser to analyze the data packet. As a result of executing said rules on the data packet, which is one example for executing an analysis step to return a parsing decision, data may be provided to an action machine according to an embodiment. Said data may be used: to manipulate data (e.g. bytes) extracted from the data packet; for command parsing processes; and/or for the assembly of a response packet having an envelope section and payload section containing information (e.g. field values) in data packet.

A 'parsing decision' as used herein is a processing operation executed by the parser by evaluating on one or more bytes of a data packet in order to determine how the data packet is to be processed and/or responded to. Typically, said parsing decision involves complex operations and may be demanding in terms of computational power.

In a further aspect the invention relates to a computer-readable non-transitory storage medium comprising instructions which, when executed by a processing device, execute the steps of the method of operating a network processor according to an embodiment.

According to the invention an action machine for a network processor, a method for operating said action machine, and computer readable media as described in the appended claims are provided.

BRIEF DESCRIPTION OF THE DRAWINGS

Preferred embodiments of the invention will now be described, by way of example only, with reference to the accompanying drawings in which.

DESCRIPTION OF THE EMBODIMENTS

Figure 1:
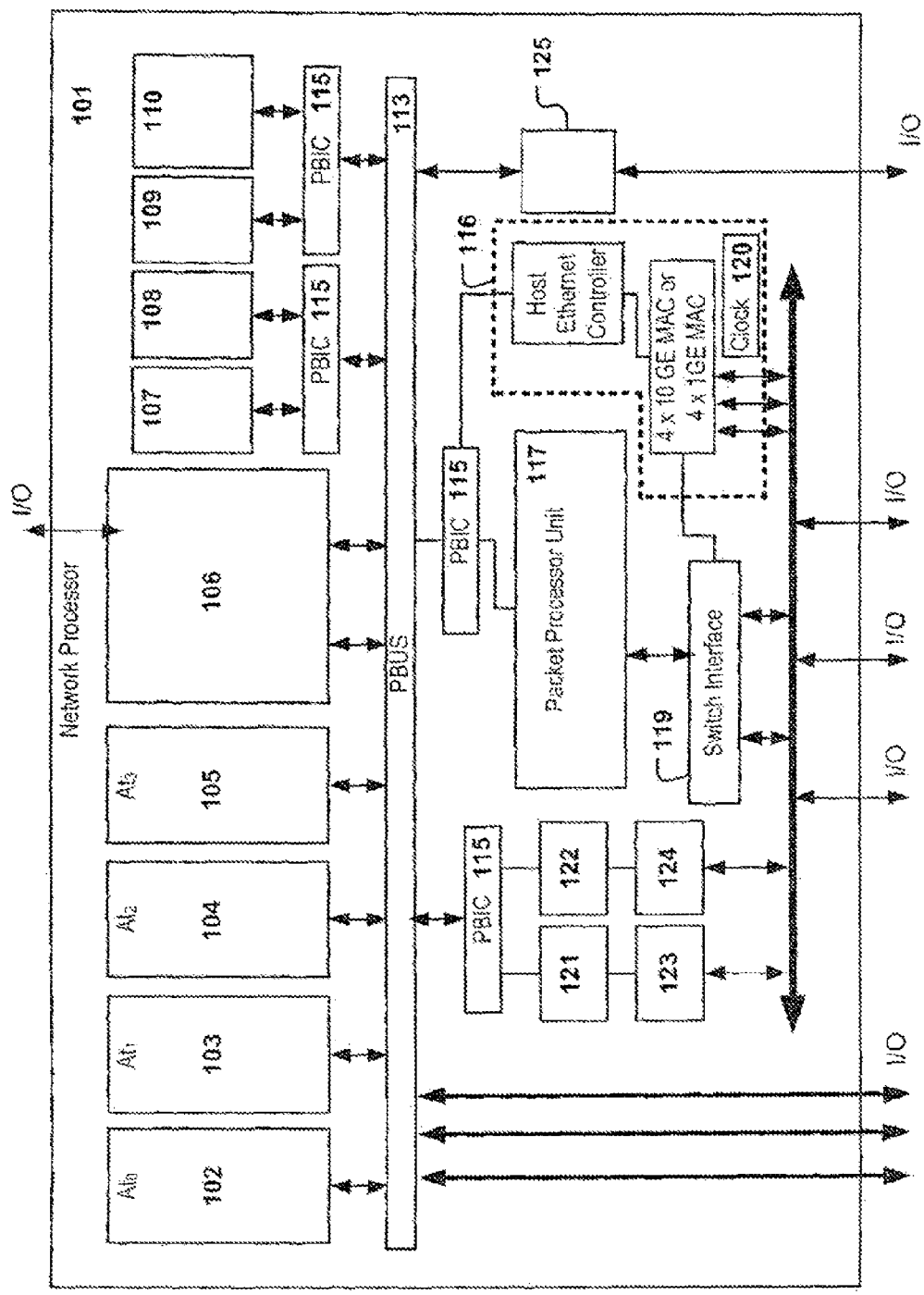
FIG. 1 depicts a high-level network processor architecture.
Figure 2:
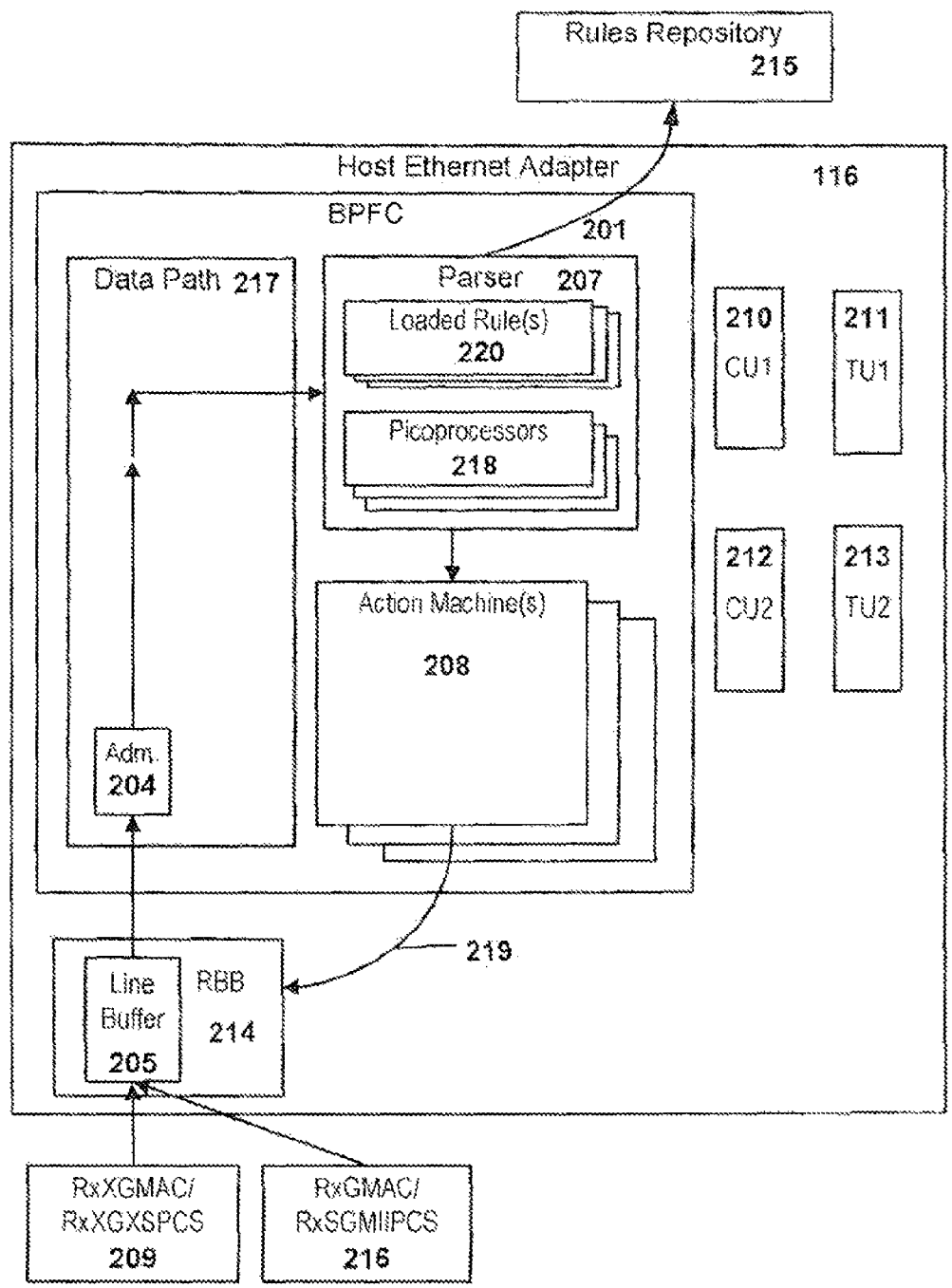
FIG. 2 depicts the host Ethernet adapter being part of the network processor in greater detail.

Illustrative embodiments may be utilized in many different types of data processing environments and/or networks. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented.

FIG. 1 depicts a network processor 101 of the 'Prism' architecture type. Said network processor comprises a multitude of components for receiving, buffering, processing and forwarding data packets. Some core components which can be identified on a high-level perspective, for example:

Processors 102-105 are, according to preferred embodiments, general purpose processors. Each processor may comprise an L2 cache and may be implemented as a combination of a micro-engine performing bit wise serial processing and a RISC processor performing packet/cell queuing. The channel processors can be grouped into a cluster of e.g. four channel processors to provide combined processing for high rate interfaces such as gigabit Ethernet.

The memory access unit 106 is in charge of performing I/O operations on the system memory. Said system memory is the main memory of the device comprising the network processor. Said device could be, for example, a router or a switch.

Several network processor modules 107-110 execute additional functions, e.g. security functions such as encryption, authentication, firewalling, and/or intrusion detection; pattern matching; compression and decompression and others.

A Host Ethernet Adapter (HEA) 116 is a physical Ethernet adapter for the processors 102-105 of the network processor. HEAs offer high throughput, low latency, and virtualization support for Ethernet connections. HEAs are also known as Integrated Virtual Ethernet adapters (IVE adapters). According to embodiments, the HEA supports a network traffic speed of e.g. 4×10 GB/s. A core function of the HEA can be seen as a module providing hardware acceleration for network processing tasks. The HEA comprises a host Ethernet controller and a media access control unit (MAC unit). A MAC is a unique identifier assigned to network interfaces for communication on the physical network segment. MAC addresses are most often assigned by the manufacturer of a network interface card and are stored e.g. in its hardware, the card's read-only memory, or some other firmware mechanism.

PBIC 115 units are interfaces between the bus 113 and other components of the network processor.

The bus 113 interconnects the elements of the network processor.

Data packets are sent between network entities and may have different forms and/or purposes. For example, a response packet is a packet sent from a NC to a MC in response to a command packets (sent from the MC to the NC), for example. Such data packets will typically adhere to a standardized communication protocol, so that the responding NC can provide network access for the MC, for example, while allowing the NC to simultaneously and transparently provide network access for a host system. One such widely used standardized communication protocol or interface is defined by the NC-SI specification.

The Packet Processor Unit 117 comprises several modules for Quality of Service (QoS) functions and data packet scheduling. It comprises a DMA module for direct system memory access. The Packet Processor Unit 117 executes data packet processing of data packets to be transported by the switch interface 119. The switch interface 119 acts as interface of the packet processor unit 117, the HEA and several I/O channels indicated at the bottom of FIG. 1.

Additional modules 121-125 are used for various I/O related functions. In the following figures, functional modules of and/or method steps executed by the HEA will be described in greater detail.

FIG. 2 depicts the host Ethernet adapter 116 which comprises a multitude of modules for receiving, processing and transmitting data packets in greater detail. Only a small subset of components and modules of the HEA is depicted in FIG. 2. Modules for processing data packets 210, 212 and modules 211, 213 for transmitting said data packets can be based—depending on the implementation of the HEA—on a multitude of different hardware and or software components such as memories, ICs, software modules, and the like. Data packets are received from a media interface such as RxXGMAC/RxXGXSPCS (component 209), RxGMAC/RxSGMIIPCS (component 216) or a reduced media independent interface (RMII). Said components 209, 216 are hardware components providing for low level hardware operations comprising e.g. receiving data packets, classifying the received packets and forwarding said data packets to the RBB unit 214. The RBB is operable to execute complex, high-level operations on the data packets which may require a considerable amount of processing time. As the number of data packets received by the RBB from the modules 209, 216 per time unit may exceed the amount of data packets the RBB unit is operable to process, the received data packets are stored in the line buffer 205. A line buffer is a data structure that holds a fixed amount of data in a sequential order, e.g. according to the order the data packets are received by the line buffer; the line buffer 205 together with the RBB unit 214 constitutes a temporary data packet buffer helping to level out differences in the speed of receiving and processing data packages by the RBB unit. The terms 'low-level' and 'high-level' as used herein indicate that 'high-level' operations are typically, but not necessarily, of complex structure, computational demanding and implemented by a software module while 'low-level' operations are typically, but not necessarily, of a more simple nature and are typically implemented by hardware modules, e.g. ASICs.

After having been processed by the RBB unit, the data packets are forwarded from the RBB unit to the BPFC module 201. The BPFC module ('BFSM Parser Filter Checksum') is a module that receives data packets from the RBB unit, processes the received data packets and returns them to the RBB unit (arrow 219). One of the main functions executed by the BPFC unit 201 is to determine which of a plurality of packet queues shall actually receive a particular processed data packet and to check whether said determined packet queue is available and ready to receive a packet. A list of available queues may be stored in a QPN table. The BPFC unit or components thereof further are responsible for tracking the packages and bytes received and processed, for classifying received packets, for checksum calculation and other tasks. The BPFC module 201 comprises three main physical and/or functional units: a data path unit 217, a parser 207 and a set of action machines 208.

The term 'unit' or 'module' are used herein synonymously and refer to functional units of a software- or hardware component of the network processor. Depending on the embodiment, a 'unit' may correspond to a physical unit, e.g. a particular hardware component or a program module, but it may likewise be the case that multiple functional units for one monolithic hardware block or software module or that functions of one functional unit are distributed among several different hardware or software modules.

The main function of the data path unit is to expose data packets received from the RBB unit to the parser 207. The admission unit 204, which is a component of the data path unit, controls which data packet received from the RBB unit is allowed to enter the data path and at what speed. The data path ensures that the speed of the data packets entering the data path is in line with the data packet processing speed of the parser 207.

The main function of the parser 207 is to process (e.g. to analyze, inspect and manage) data packets received from the data path unit. The parser decodes one or more fields of the packets in order to determine the packet format (i.e. the protocol used for storing and transmitting the data contained in a data packet). According to preferred embodiments, the parser is implemented as software module and executed by one or more picoprocessors 218. The main objective of the parser according to embodiments of the invention is to analyze the packet and feed other network processor components, in particular packet queues and action machines, with the data packets, whereby the feeding depends on the result of said data packet analysis. The parser 207 is operable to read one or more rules stored in rules repository 215, load said rules into one or more registers of the processor executing the instructions of the parser and to execute the loaded one or more rules on the data packet. According to the depicted embodiment, said one or more registers may be the registers of the picoprocessors 218.

According to embodiments of the invention, the parser can be considered as finite state machine and the rules used by the parser to analyze data packets can be considered as instructions determining when and how a state transition of said finite state machine occurs. The Rules, when executed by the parser, describe and determine how the parser progresses through a set of different states. The rules according to embodiments of the invention allow the software-based parser to be run more efficiently on the picoprocessors 218.

The third major component of the BPFC unit is a set of action machines 208. The action machines are hardware components, e.g. logic blocks being part of the network processor chip. According to some embodiments, said logic blocks may be implemented as ASICs. The action machines are in charge of specific networking tasks such as providing for a MAC-filter or for VLAN filters, for calculating an IP/TCP checksum, for example. However, there is now proposed an action machine for the task of general purpose processing of packet data fields.

Figure 3:
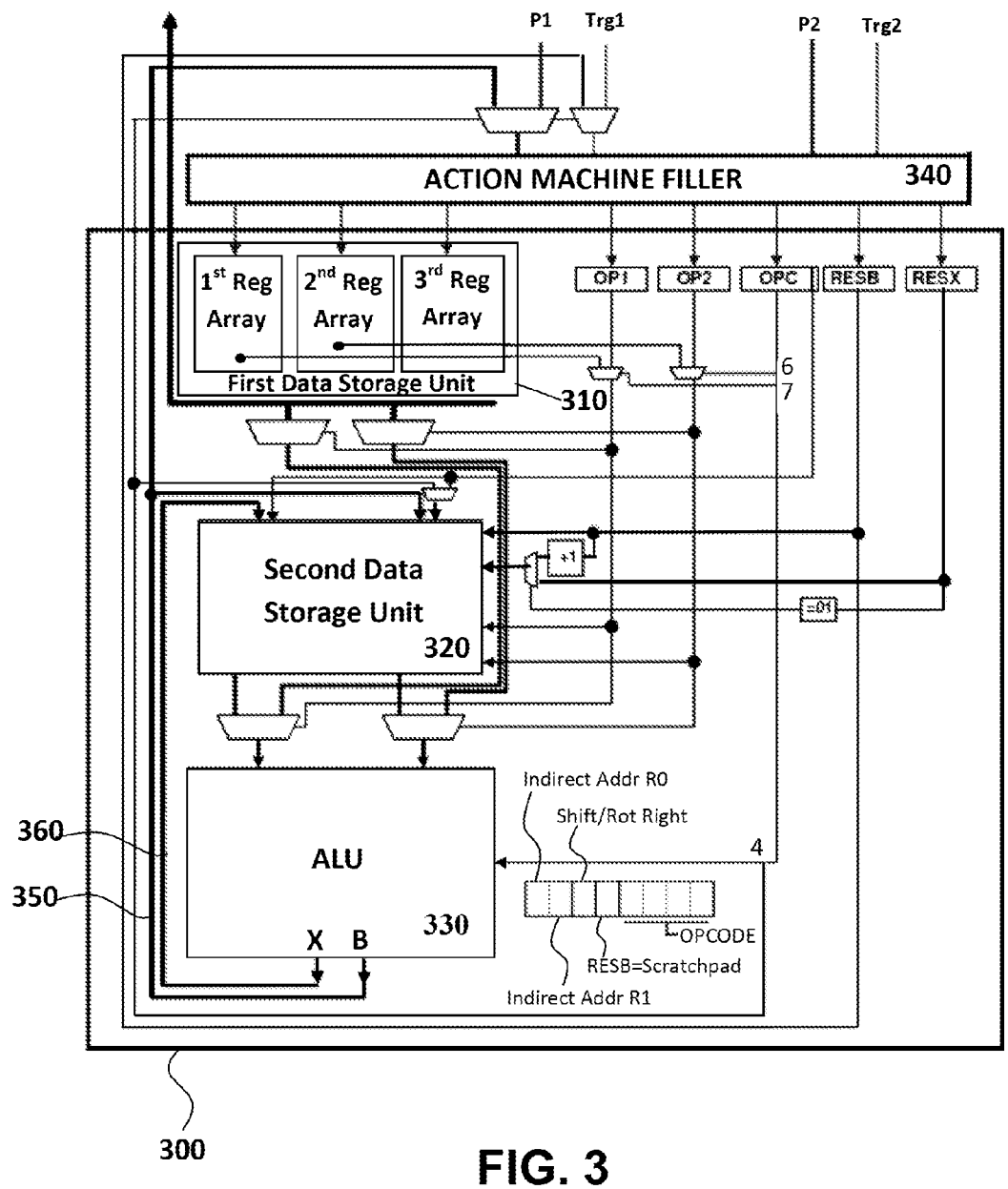
FIG. 3 depicts an action machine for processing packet data in a network processor according to an embodiment.

FIG. 3 depicts an action machine 300 for general purpose processing in a network processor according to an embodiment. It will be appreciated that FIG. 3 is a schematic block diagram showing only a simplified representation of the action machine. The action machine comprises: first 310 and second 320 data storage unit adapted to store data for processing; and a processing unit 330 adapted to process data from the first and second data storage units.

The first storage unit 310 is adapted to be accessed by the processing unit 330 and a unit external to the action machine (such as an Action Machine Filler (AMF) 340, for example), whereas the second storage unit 320 is adapted to only be accessed by the processing unit 330.

Here, the first data storage unit 310 comprises a plurality of byte-wide registers adapted to store values for, or from, fields of a packet adhering to a standardized communication protocol such as the NC-SI specification. More specifically, the first data storage unit 310 comprises first 410 to third 420 register arrays, each register array comprising three (3) byte wide registers. The structure of the first data storage unit 310 is described in more detail below (with reference to FIG. 4).

The first data storage unit 310 may be referred to as an externally accessible data storage unit since it can be employed for loading data from/to a packet parser via an AMF 340, for example. In other words, the first data storage unit 310 is adapted to be visible to a parser of a network processor (through the same hardware interface as other action machines that may be included a network processor), such that the parser may write data (e.g. load packet data) to the first data storage unit 310 as is it was a set of Target Input Registers (TIRs). The first data storage unit 310 is also adapted to be visible to the processing unit 330, such that the processing unit can write/read data to/from the first data storage unit 310.

The second data storage unit 320 comprises a plurality of byte-wide registers adapted to store values for, or from, the processing unit 330. More specifically, the second data storage unit 320 comprises two hundred and fifty six (256) byte wide registers.

The second data storage unit 320 may be referred to as a private (e.g. restricted access) data storage unit which may be employed for use only by the processing unit 330 of the action machine 300. In other words, the second data storage unit 320 is adapted to only be directly visible to the processing unit 330, such that only the processing unit may write/read data to/from the second data storage unit 330.

The processing unit 330 of this embodiment comprises an Arithmetic Logic Unit (ALU) 330 adapted to manipulate data from the first and/or second data storage units. Such data manipulation tasks may include additions, comparisons, realignments, bit-maskings, concatenations, etc.

The result(s) of such data manipulation may then be stored in the first 310 and/or second 320 data storage units.

It is also noted that first 350 and second 360 data buses are connected between the processing unit 330 and the second data storage unit 320. The data buses 350 and 360 are adapted to support simultaneous transfer of data from ALU 330 and the second data storage unit 320. Thus, where a result of processing undertaken by the ALU 330 comprises two parts (for example, a main or base part of a result such as an 8-bit addition, and a complementary part of the result such as carry out of the 8-bit addition), the two parts may be written simultaneously to different locations of the second data storage unit 320.

Also, the first data bus 350 is also provided to the AMF 340. In this way, the result of data processing/manipulation can be provided from the ALU 330 to the AMF 340 interface, thereby enabling the result to be provided to another action machine via the AMF.

The action machine may be viewed as a dedicated action machine for data processing and/or data manipulation which contains structured data storage and an ALU. The action machine 300 may be accessed by a parser of a network processor through the conventional AMF 340 hardware interface that is employed to access other action machines. This may provide a simple way for a ruleset to use the action machine 300 as a slave picoprocessor, thereby relieving the parser of data processing/manipulation processes.

The embodiment of FIG. 3 employs a concept of reducing an amount of data/information that the action machine 300 shares with an external unit such as a packet parser. The first, externally-accessible data storage unit 310 can be loaded by a parser through the common AMF interface 340 and data in the first data storage unit 310 can be exposed to both the parser and the ALU 330. The second, private data storage unit 320 stores data which is kept private to the action machine 300 (in other words, only read/written under control of the ALU 330). By arranging the second, private data storage unit 320 to have a larger data storage capacity than the first, externally-accessible data storage unit 320, the action machine 300 allows only a limited amount of data to be shared between the ALU 330 and external parser, whilst also providing a large data repository accessible only by the ALU 330 without complicating and/or increasing the size of common AMF interface 340. Reducing the size of the first, externally accessible data storage unit, and thus flexibility in addressing, may also allow a reduction or simplification in rule format/complexity.

Figure 4:
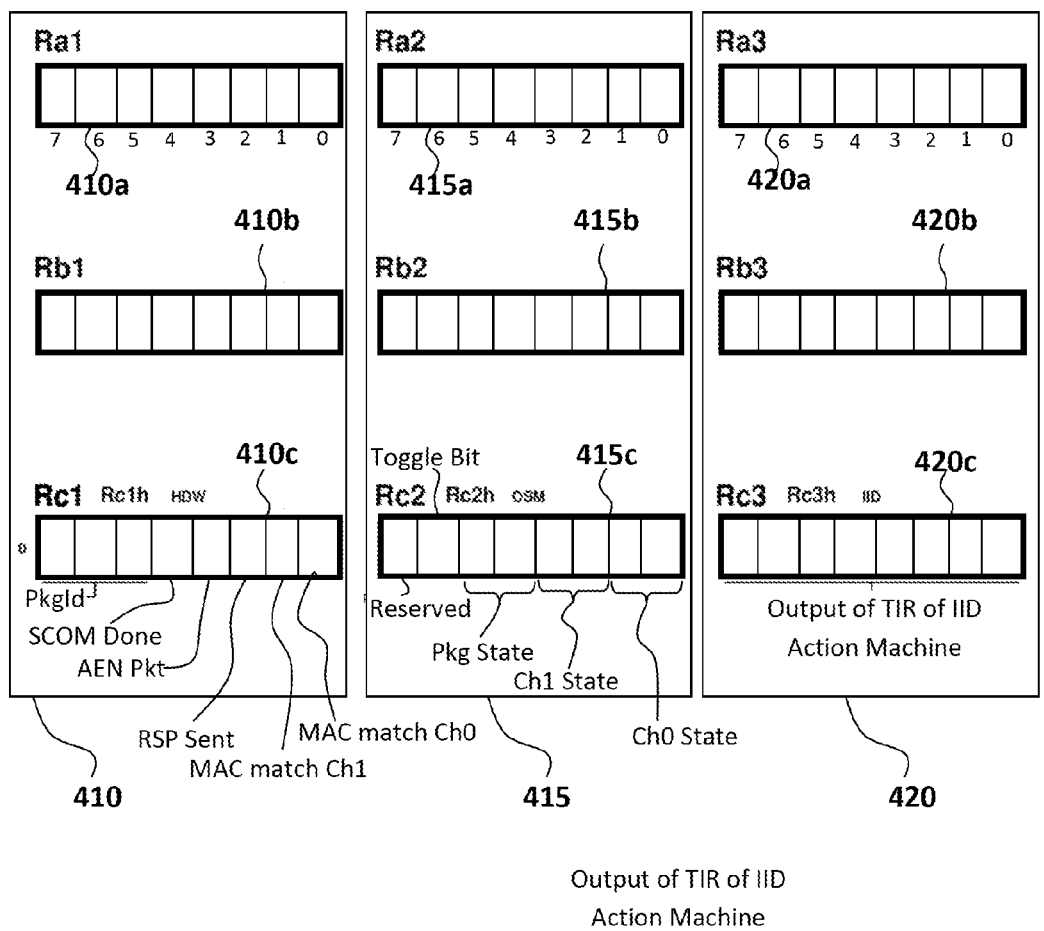
FIG. 4 depicts the register array employed in first data storage unit of FIG. 3.

Thus, referring now to FIG. 4, there is depicted the register array employed in first data storage unit of FIG. 3. The first data storage unit 310 comprises a plurality of byte-wide registers adapted to store values for, or from, fields of a packet adhering to a standardized communication protocol such as the NC-SI specification. More specifically, the first data storage unit 310 comprises first 410 to third 420 register arrays, each register array comprising first to third byte wide registers (reference by the suffixes a to c, respectively).

The first byte-wide registers 410a, 415a, 420a of the first 410 to third 420 register arrays have no particular reserved use. Instead, these registers (labeled Ra1, Ra2 and Ra3) may be typically used by a ruleset to expose bytes (such as those moved from the second data storage unit or from the incoming stream of packets) to an external parser or to the processing unit 330.

The second byte-wide registers 410b, 415b, 420b of the first 410 to third 420 register arrays are also used by the ruleset to expose bytes (such as those moved from the second data storage unit or from the incoming stream of packets) to an external parser. These registers (labeled Rb1, Rb2 and Rb3) also expose the same bytes as operands or as indirect addresses to the processing unit 330.

The third byte-wide registers 410c, 415c, 420c of the first 410 to third 420 register arrays implement status registers. These registers (labeled Rc1, Rc2 and Rc3) are updated by the ruleset, the parser or some logic arrangements from the network processor. All bits of the status registers are exposed to both the parser and the processing unit 330.

The operation of the second data storage unit 320 and the processing unit 330 is controlled by five command registers (labeled OP1, OP2, OPC, RESB and RESX). These registers are fed by the packet parser under the control of a ruleset during the parsing process of a received command packet. OP1 340 and OP2 350 specify the first and second operands to be processed by the ALU 330. Such an operand is either indicated by the address of a register from the first or second data storage units 310 or 320, or an immediate value. RESB 360 specifies the destination address of the base output B of the ALU while RESX 370 specifies the destination address of the extension X of the ALU. The OPC register 380 holds the operation code (OPCODE) of the ALU 330. Operation codes include ALU operations such as set, clear, and, or, xor, shift, rotate, move, add, subtract, increment, decrement, and compare. Such an operation is activated/triggered when the OPC command register 380 is written. The result of the base output B of the ALU 330 can re-redirected to the AMF 340 or to the second data storage unit 320. The result of the extension output X of the ALU can only be directed to the second data storage unit 320.

Figure 5:
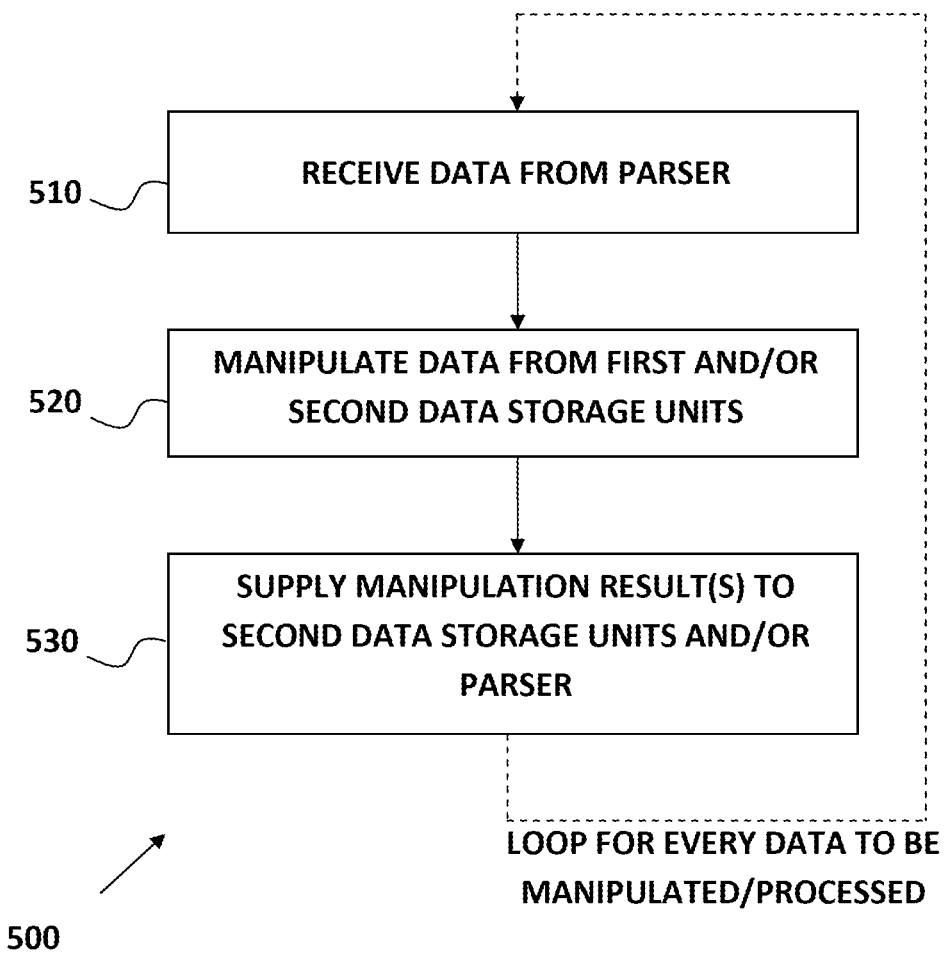
FIG. 5 depicts a flow diagram of a method of operating an action machine for processing packets in a network processor according to an embodiment.

Referring now to FIG. 5, there is depicted a flow diagram of a method 500 of operating an action machine for processing packet data in a network processor according to an embodiment. The method starts when a data packet is received at the network processor containing the action machine, and the command packet starts to be parsed by a parser of the network processor. While the command packet is being parsed, the parser supplies data to the action machine (on the fly), via a common AMF interface for example. The data from the parser is received by the action machine in step 510. This step of receiving data may include loading the first data storage unit with data (via the AMF interface for example), receiving instructions or operation codes (referred to as OPCODEs) as the processing unit, and/or receiving operation signals (such as enable/disable signal for example) as a component of the action machine.

Next, in step 520, the processing unit manipulates data from the first and/or second data storage unit in accordance with requirements (as indicated by one or more received OPCODEs for example).

A result of the data manipulation undertaken by the processing unit is then supplied to the second data storage unit and/or the parser (via the AMF interface for example) in step 530. Supplying of a result to multiple different locations may be undertaken simultaneously, where multiple data communications are appropriately provided and arranged for example.

In other embodiments, the step 530 may also comprise supplying (and storing) a result of the data manipulation to the first data storage unit.

The method may then be repeated for every data to be manipulated/processed. Thus, the method may loop back to step 510.

Figure 6:
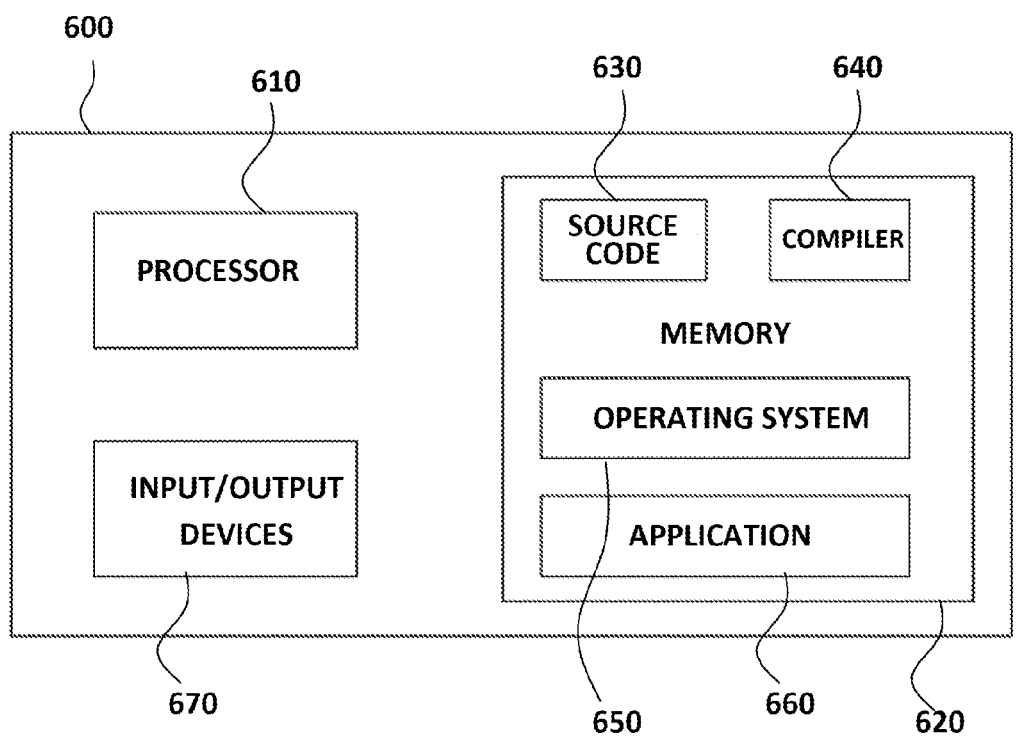
FIG. 6 illustrates an example of a computer in which an embodiment may be employed.

FIG. 6 illustrates an example of a computer 600 in which an action machine may be employed. Various operations discussed above may utilize the capabilities of the computer 600. An action machine may be incorporated in any element, module, application, and/or component discussed herein, such as input and/or output (I/O) devices 670.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more I/O devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a microprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory

620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand various embodiments with various modifications are contemplated.

What is claimed is:

1. An action machine for processing packet data in a network processor, the action machine comprises:
   first and second data storage units adapted to store data for processing, wherein the first data storage unit comprises three byte wide registers adapted to store values for fields extracted from a data packet adhering to a standardized communication protocol, the values being received from a packet parser of a network processor; and
   a processing unit adapted to process data from the first and second data storage units,
   wherein the first storage unit is adapted to be accessed by the processing unit and a unit external to the action machine,
   and wherein the second storage unit comprises two-hundred and fifty six byte wide registers adapted to only be accessed by the processing unit.

2. The action machine of claim 1, wherein the processing unit is adapted to manipulate data from the first and/or second data storage units and to provide a result of said manipulation to at least one of: the first data storage unit, the second data storage unit; and a unit external to the action machine.

3. The action machine of claim 1, wherein the processing unit comprises an arithmetic logic unit adapted to perform at least one of: an addition; a comparison; a realignment; a bit-masking; and a concatenation.

4. The action machine of claim 1, further comprising a plurality of data buses connecting the processing unit and the second data storage unit, the plurality of data buses being adapted to permit simultaneous transfer of data to/from different storage locations of the second data storage unit.

5. The action machine of claim 1, wherein the standardized communication protocol adheres to a Network Controller-Sideband Interface, NC-SI, specification.

6. A network processor comprising an action machine according to claim 1.

7. A method of operating an action machine for processing packet data in a network processor, the action machine comprising: first and second data storage units adapted to store data for processing; and a processing unit adapted to process data from the first and second data storage units, wherein the first storage unit is adapted to be accessed by the processing unit and a unit external to the action machine, and wherein the second storage unit comprises two-hundred and fifty six byte wide registers adapted to only be accessed by the processing unit, the method comprising:
   causing the processing unit to manipulate data from the first and/or second data storage units and to provide a result of said manipulation to at least one of: the first data storage unit, the second data storage unit; and a unit external to the action machine; and
   storing data received from a packet parser of a network processor in the first data storage unit, wherein the first data storage unit comprises three byte wide registers adapted to store values for fields extracted from a data packet adhering to a standardized communication protocol, the values being received from a packet parser of a network processor.

8. The method of claim 7, wherein the action machine further comprises a plurality of data buses connecting the processing unit and the second data storage unit, and wherein the method further comprises:
   controlling the processing unit to simultaneously transfer data to/from different storage locations of the second data storage unit via the plurality of data buses.

9. The method of claim 7, further comprising the step of:
   causing the action machine to supply data to a packet parser of a network processor.

10. A method of operating a network processor comprising a packet parser and an action machine, the action machine comprising: first and second data storage units adapted to store data for processing; and a processing unit adapted to process data from the first and second data storage units, wherein the first storage unit is adapted to be accessed by the processing unit and a unit external to the action machine, and wherein the second storage unit is adapted to only be accessed by the processing unit, the method comprising:
   causing the packet parser to parse a data packet and to supply data relating to a result of parsing the data packet to the action machine;
   causing the action machine to receive the data supplied by the parser; and
   based on the received data, operating the action machine according to claim 7.

11. A computer program product for processing packets in a network processor, wherein the computer program product comprises a computer-readable storage medium having computer-readable program code embodied therewith, the computer-readable program code configured to perform all of the steps of a method of operating an action machine for processing packet data in a network processor, the action machine comprising: first and second data storage units adapted to store data for processing; and a processing unit adapted to process data from the first and second data storage units, wherein the first storage unit is adapted to be accessed by the processing unit and a unit external to the action machine, and wherein the second storage unit comprises two-hundred and fifty six byte wide registers adapted to only be accessed by the processing unit, the method comprising:

causing the processing unit to manipulate data from the first and/or second data storage units and to provide a result of said manipulation to at least one of: the first data storage unit, the second data storage unit; and a unit external to the action machine; and storing data received from a packet parser of a network processor in the first data storage unit, wherein the first data storage unit comprises three byte wide registers adapted to store values for fields extracted from a data packet adhering to a standardized communication protocol, the values being received from a packet parser of a network processor.

12. The computer program product of claim 11, wherein the computer-readable medium is selected from the group consisting of a CD, a DVD, a flash memory card, a USB memory stick, a random access memory, a read-only memory, a computer hard disk, a storage area network, a network server, and an Internet server.

* * * * *